(12) United States Patent
Takehara

(10) Patent No.: US 11,829,917 B2
(45) Date of Patent: Nov. 28, 2023

(54) STANDBY POSITION DETERMINATION DEVICE AND STANDBY POSITION DETERMINATION METHOD

(71) Applicant: Panasonic Intellectual Property Management Co., Ltd., Osaka (JP)

(72) Inventor: Hirokazu Takehara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 187 days.

(21) Appl. No.: 17/427,664

(22) PCT Filed: Dec. 23, 2019

(86) PCT No.: PCT/JP2019/050335
§ 371 (c)(1),
(2) Date: Aug. 2, 2021

(87) PCT Pub. No.: WO2020/170595
PCT Pub. Date: Aug. 27, 2020

(65) Prior Publication Data
US 2022/0076176 A1    Mar. 10, 2022

(30) Foreign Application Priority Data
Feb. 20, 2019    (JP) ................. 2019-027971

(51) Int. Cl.
*G06Q 10/0633*    (2023.01)
*G06Q 10/0631*    (2023.01)

(52) U.S. Cl.
CPC ... *G06Q 10/0633* (2013.01); *G06Q 10/06316* (2013.01); *G06Q 10/063114* (2013.01)

(58) Field of Classification Search
CPC .......................................... G06Q 10/00–50/00
USPC .............................................. 705/7.11–7.42
See application file for complete search history.

(56) References Cited

U.S. PATENT DOCUMENTS

| | | | |
|---|---|---|---|
| 10,089,586 B2* | 10/2018 | Vestal | G05D 1/0274 |
| 2008/0125893 A1* | 5/2008 | Tilove | B25J 9/1666 |
| | | | 700/103 |
| 2010/0241248 A1* | 9/2010 | Zhang | G05B 19/41885 |
| | | | 700/29 |
| 2014/0088763 A1* | 3/2014 | Hazan | B25J 9/1666 |
| | | | 700/255 |
| 2017/0061758 A1* | 3/2017 | Sudo | G08B 19/00 |

(Continued)

FOREIGN PATENT DOCUMENTS

JP    11-300585    11/1999

OTHER PUBLICATIONS

International Search Report of PCT application No. PCT/JP2019/050335 dated Mar. 10, 2020.

*Primary Examiner* — Alan S Miller
(74) *Attorney, Agent, or Firm* — PEARNE & GORDON LLP

(57) ABSTRACT

In a standby position determination method, work frequency information including a plurality of work frequencies that a worker works at each of a plurality of production facilities is calculated. On the other hand, floor arrangement information including facility layouts of the plurality of production facilities is acquired. The standby position where the worker waits for the work in the floor is determined based on the work frequency information and the floor arrangement information.

20 Claims, 12 Drawing Sheets

(56) References Cited

U.S. PATENT DOCUMENTS

2017/0308842 A1* 10/2017 Tsuzuki ......... G06Q 10/063112
2018/0210458 A1* 7/2018 Chen .................... G05D 1/0274
2019/0291277 A1* 9/2019 Oleynik ................ B25J 9/1697

* cited by examiner

M3 (M4 TO M6)

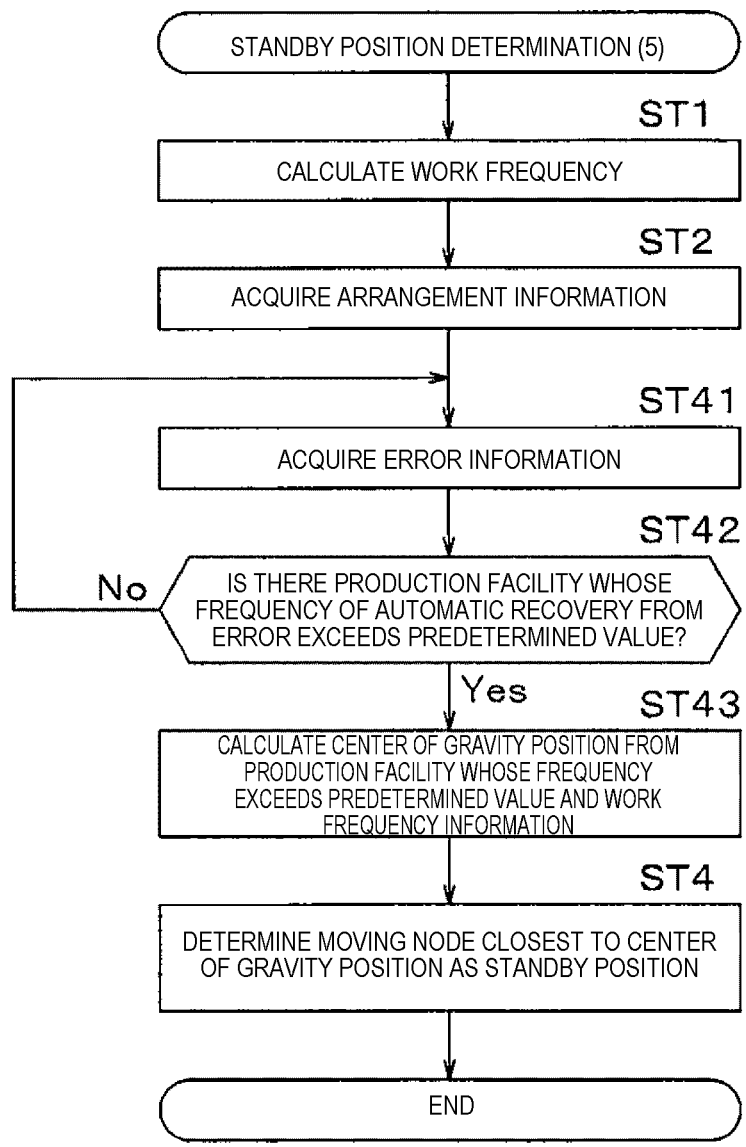

STANDBY POSITION DETERMINATION DEVICE AND STANDBY POSITION DETERMINATION METHOD

TECHNICAL FIELD

The present disclosure relates to a standby position determination device and a standby position determination method that determine a standby position on a floor on which production facilities are arranged.

BACKGROUND ART

On a floor where a plurality of production facilities for processing workpieces are arranged, one worker is in charge of work of recovering errors that occur in the plurality of production facilities and work of replenishing members consumed in the production facilities. When a plurality of workers are arranged on the floor, the production facilities that the worker is in charge are assigned to each worker such that the production can be performed efficiently based on the production plan. Patent Literature 1 discloses a system in which a progressing state of production is collected, and when a difference from the plan exceeds a predetermined range, the allocation of the production facilities (worker arrangement) that each worker is in charge of is changed (rearrangement).

CITATION LIST

Patent Literature

PTL1: Japanese Patent Unexamined Publication No. H11-300585

SUMMARY OF THE INVENTION

A standby position determination device in the present disclosure includes a standby position determination unit. The standby position determination unit determines a standby position where a worker waits for a work on a floor based on work frequency information and floor arrangement information, the work frequency information including a plurality of work frequencies that the worker works in each of a plurality of production facilities, the floor arrangement information including facility layouts of the plurality of production facilities.

In a standby position determination method in the present disclosure, work frequency information including a work frequency that a worker works at each of a plurality of production facilities and floor arrangement information including facility layouts of the plurality of production facilities are acquired. A standby position where the worker waits for a work on a floor is determined based on the work frequency information and the floor arrangement information.

According to the present disclosure, it is possible to determine the standby position with good production efficiency in the floor where the production facilities are arranged.

BRIEF DESCRIPTION OF DRAWINGS

FIG. 12 is a flowchart illustrating a fifth standby position determination method according to the exemplary embodiment of the present disclosure.

DESCRIPTION OF EMBODIMENT

Figure 1:
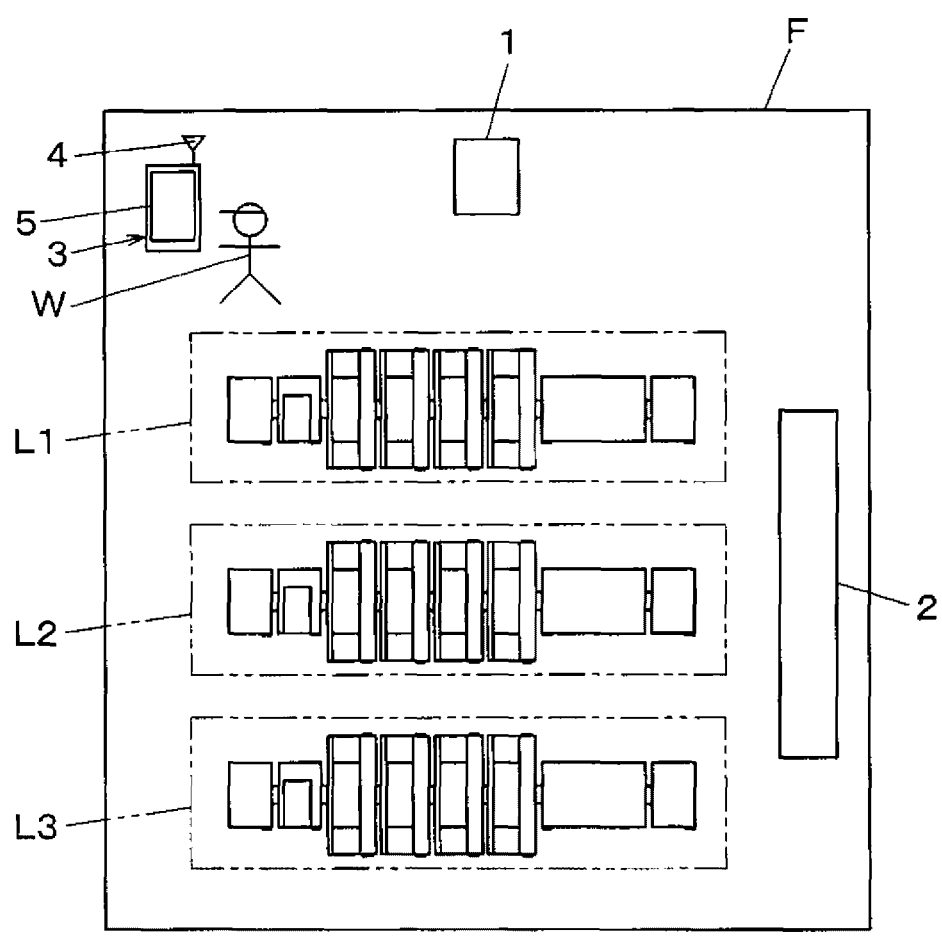
FIG. 1 is a schematic diagram of an example of a floor on which a production management device (a standby position determination device) and a plurality of production facilities are arranged according to an exemplary embodiment of the present disclosure.

Prior to the description of the exemplary embodiment of the present disclosure, the background to the present disclosure will be briefly described. During a standby time in which a work to be performed is not occurring in all the production facilities that the worker is in charge, each worker waits at an appropriate position in preparation for the next work. In the related art including Patent Literature 1, a system allocates the production facilities that each worker is in charge in consideration of production efficiency. However, the standby position is defined by each worker based on experience. Therefore, the worker is not limited to standby at the optimum position with good production efficiency, it is desired to determine the standby position of the worker with good production efficiency for the entire floor.

The present disclosure provides a standby position determination device and a standby position determination method capable of determining a standby position with good production efficiency in a floor on which a plurality of production facilities are arranged.

Hereinafter, an exemplary embodiment of the present disclosure will be described in detail with reference to the drawings. The configuration, shape, and the like described below are examples for the explanation, and can be appropriately changed according to the specifications of the production management device, component mounting line, component mounter, and the like. In the description below, the same reference numerals will be given to the corresponding elements in all the drawings and duplicate description will be omitted.

First, an outline of floor F on which component mounting lines L1 to L3 are arranged will be described with reference to FIG. 1. In floor F, three component mounting lines L1 to L3 are arranged in parallel. Each of component mounting lines L1 to L3 is configured by connecting a plurality of production facilities including a printing device and a component mounter as described later, and has a function of producing a mounting board (product) on which components are mounted on a board. The number of component mounting lines L1 to L3 arranged on floor F does not need to be three, and may be one, two, or four or more.

Production management device 1 and component shelf 2 are disposed on floor F. Production management device 1 performs execution of various simulations relating to production of mounting boards in component mounting lines L1 to L3, determination of the standby position of worker W, creation of various parameters used in production facilities, and the like. That is, production management device 1 has a function as a standby position determination device. In component shelf 2, members such as masks and cream solders used in the printing devices configuring component mounting lines L1 to L3, components, nozzles, and mounting heads used in the component mounters are stored.

In FIG. 1, production management device 1 is disposed in floor F where the production facilities are arranged, but may be disposed in a room other than floor F in which the production facilities are arranged. In addition, component shelf 2 is disposed in one place next to component mounting lines L1 to L3, but the disposition of component shelf 2 is not limited to this. Component shelf 2 is appropriately disposed in relation to the shape of floor F and arranged component mounting lines L1 to L3. In addition, component shelf 2 may be disposed in two or more places.

In FIG. 1, worker W carries mobile terminal 3. Mobile terminal 3 is a smartphone, a tablet PC (personal computer), or the like. Mobile terminal 3 includes a terminal-side communication unit 4 that wirelessly communicates with production management device 1 to exchange information, and touch panel 5 that has a display function and an input function. Mobile terminal 3 performs processing for displaying various information received from production management device 1 and displays the information on touch panel 5. In addition, mobile terminal 3 transmits various information and the like input from touch panel 5 to production management device 1.

Next, detailed configurations of component mounting lines L1 to L3 will be described with reference to FIG. 2. Component mounting lines L1 to L3 have the same configuration, and component mounting line L1 will be described as a representative. Component mounting line L1 is configured by connecting production facilities that execute production works, such as board supply device M1, printing device M2, component mounters M3 to M6, reflow device M7, and board recovery device M8 in series, from the upstream (left side on paper) toward the downstream (right side on paper) in the board conveying direction. Component mounting line L1 is a group of production facilities connected via communication network 6, and the production facilities may not be physically connected to each other. In addition, communication network 6 may be wired or may be wireless.

Board supply device M1, printing device M2, component mounters M3 to M6, reflow device M7, and board recovery device M8 are connected to management computer 7 via communication network 6. Management computer 7 stores production data including control programs used in each production facility, a work history of each production facility, error information, and the like, and performs overall management of the production of the mounting board in component mounting line L1. Management computer 7 may be provided in component mounting lines L1 to L3 individually or in common. Management computer 7 is connected to production management device 1 via communication network 6.

Figure 2:
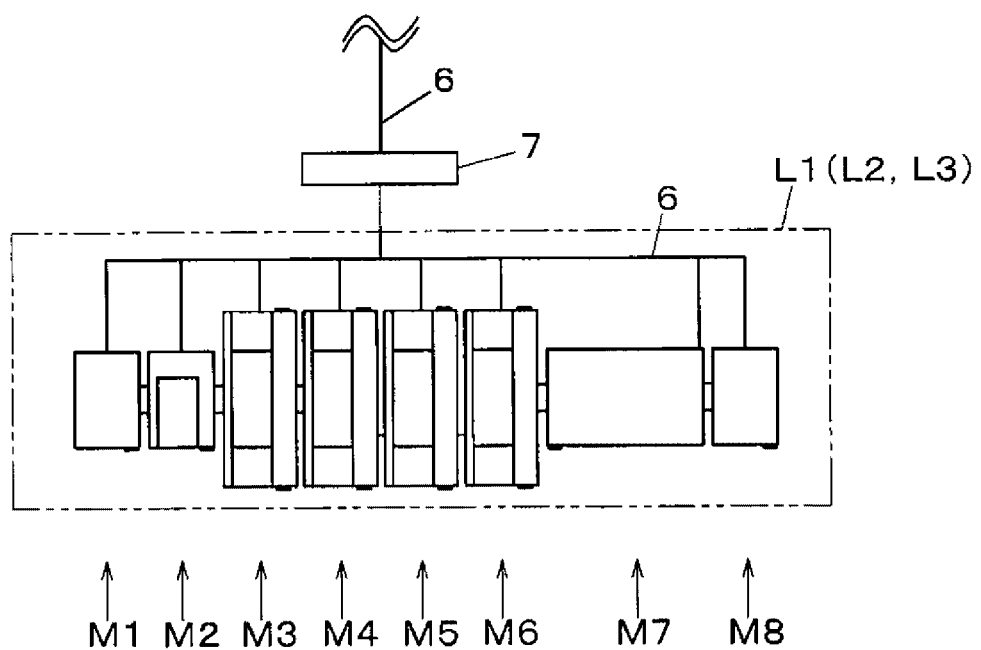
FIG. 2 is a configuration diagram of component mounting lines included in each of the plurality of production facilities illustrated in FIG. 1.

In FIG. 2, board supply device M1 includes a storage unit such as a rack for storing a plurality of boards, and supplies the board taken from the storage unit to the device on the downstream. Printing device M2 prints the cream solder on the board carried in from the upstream via the mask installed on the printing work unit. The cream solder is a consumable item, and printing device M2 is appropriately replenished with the cream solder when the remaining amount becomes low during production. In addition, at the time of setup change of switching the model of the mounting board to be produced, in printing device M2, the mask is replaced and the control program including the printing conditions is changed.

Component mounters M3 to M6 execute a component mounting work. In the component mounting work, component mounters M3 to M6 mount the component on the board on which the cream solder is printed with the mounting head. Component mounting line L1 is not limited to a configuration having four component mounters M3 to M6. The number of component mounters may be 1 to 3, or greater than or equal to 5. Reflow device M7 heats the board carried into the inside by a board heating unit, melts the cream solder on the board and then cures the board, and joins the electrode portion of the board and the components. At the time of setup change, in reflow device M7, the control program including the heating conditions and the like is changed. Board recovery device M8 includes a storage unit such as a rack for storing a plurality of boards, and receives the board carried out by the device at the upstream and recovers the boards in the storage unit.

In FIG. 2, one working position P (refer to FIG. 5), which is a position where worker W works, is set in each of board supply device M1, printing device M2, reflow device M7, and board recovery device M8. Working position P is positioned on the front side (lower side of the drawing) of each production facility. In addition, two working positions P are set on the front side and the rear side (lower side and upper side of the drawing) of the respective production facility in each of component mounters M3 to M6. For example, when replenishing printing device M2 with the cream solder, worker W takes the cream solder for replenishment and moves to working position P on the front side of printing device M2, and executes the replenishing work at working position P.

Figure 3:
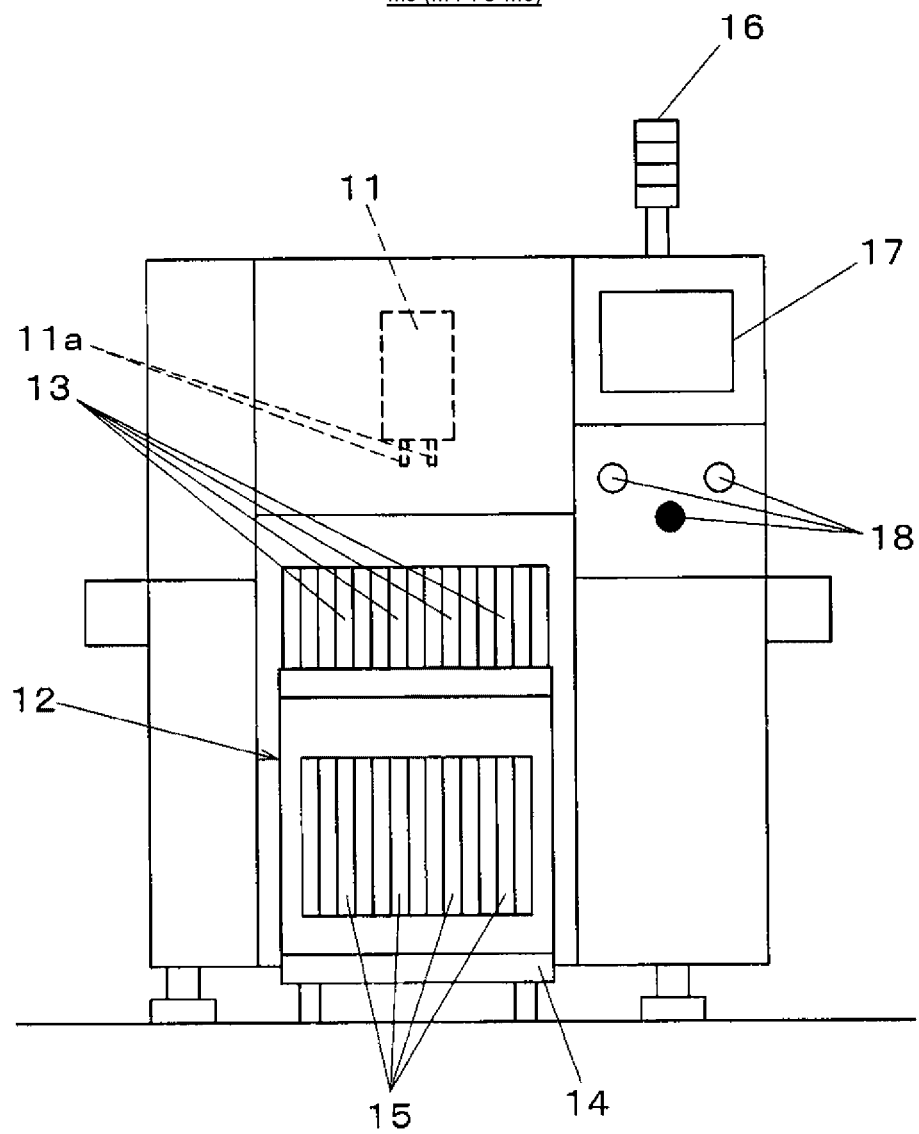
FIG. 3 is a configuration diagram of a component mounter included in the component mounting line illustrated in FIG. 2.

Next, a configuration of component mounters M3 to M6 will be described with reference to FIG. 3. FIG. 3 is a plan view of component mounter M3 viewed from the front side (lower side of FIG. 2). Component mounters M3 to M6 have the same configuration, and the component mounter M3 will be described as a representative. Mounting head 11 that mounts the component on the board and a head moving mechanism (not illustrated) that horizontally moves mounting head 11 are disposed above the center of component mounter M3. Nozzle 11a for holding the component is installed to the lower end of the mounting head 11. Component supply units 12 are provided below the front side and below the rear side (not illustrated) of component mounter M3, respectively.

Carriage 14 that holds a plurality of tape feeders 13 in parallel which are component supply devices is installed on the upper part of each component supply units 12. In carriage 14, below tape feeder 13, a plurality of reels 15 for winding and storing the component supply tape for accommodating the components is held in parallel. Tape feeder 13 internally conveys the component supply tape drawn out from reel 15 and supplies the components accommodated in the component supply tape to the component mounting unit (not illustrated) in order.

Signal tower 16 is disposed on the upper surface of component mounter M3. Signal tower 16 notifies worker W of a status of component mounter M3 by turning on, turning off, or blinking a signal lamp. On the upper part of the front work surface and on the upper part of the rear work surface (not illustrated) of component mounter M3, touch panel 17 and various operation buttons 18 are provided. Touch panel 17 has a display function for displaying an operation screen of component mounter M3 and an input function for inputting commands and various information by operating the displayed operation screen by worker W. Worker W operates operation button 18 at the time of starting the work, stopping the work, emergency stop, and the like.

In component mounter M3, signal tower 16 or the like notifies of a fact that the remaining number of components stored in the component supply tape is low, and prompts worker W in charge to perform the component replenishing work. In the component replenishing work, worker W moves to working position P on the side where tape feeder 13 which is a target of the component replenishing work is located, with replenishment reel 15. Worker W pulls out a new component supply tape from replenishment reel 15 and engages the replenish reel to the rear end of the component supply tape supplying the component. Alternatively, worker W inserts a new component supply tape into tape feeder 13 for the component replenishment.

In FIG. 2, when changing the setup for switching the model of the mounting board to be produced in component mounting lines L1 to L3, an internal setup work to replace a mask of printing device M2, tape feeder 13, mounting head 11, nozzle 11a, reel 15, and the like of component mounters M3 to M6 is executed, and the configuration of each production facility is changed. In addition, the control program is changed in each production facility. In addition, when the number of tape feeders 13 and reels 15 to be replaced is large in component mounters M3 to M6, tape feeder 13 and reel 15 used in the production of the next model are arranged in advance in the spare carriage. At the time of setup change, carriage 14 installed on component mounters M3 to M6 is replaced with a spare carriage.

In FIG. 3, component mounter M3 includes a plurality of sensors (not illustrated) inside, a state of component mounter M3 during the component mounting work is monitored. When the sensor detects an abnormal state (error), signal tower 16 or the like notifies worker W of that effect, and the information on that effect is transmitted to management computer 7 or production management device 1. Examples of the errors that occur during the component mounting work include an automatically recoverable error that can be automatically recovered by component mounter M3 itself by performing a re-execution or parameter changing after the error occurs, and an automatically unrecoverable error which is not automatically recoverable and requires a direct error recovering work by worker W.

The automatically recoverable error includes a board misalignment error, in which the board conveyed into component mounter M3 stops at a position shifted from a predetermined board stop position, and a holding posture error in which the component picked up from tape feeder 13 by nozzle 11a is not held normally. The board misalignment error can be automatically recovered by adjusting the stop position. The holding posture error can be automatically recovered by re-execution of the component picked up or adjustment of the feeding amount of the component supply tapes conveyed by tape feeder 13.

The automatically unrecoverable error includes a jamming error in which the component supply tape supplied to tape feeder 13 gets entangled and stops, a component drop error in which the component held by nozzle 11a is dropped on the board, and a component holding error in which nozzle 11a cannot hold the component. When the automatically unrecoverable error is detected, signal tower 16 notifies worker W of that effect and prompts worker W to perform the error recovering work. Even in a case of the automatically recoverable error, if it cannot be automatically recovered by the work of component mounter M3 itself, similarly to the automatically unrecoverable error, the notification by signal tower 16 and the error recovering work by worker W are performed. When the error is resolved, the component mounting work is restarted by the operation of operation button 18 by worker W.

Next, a configuration of production management device 1 will be described with reference to FIG. 4. Production management device 1 is a computer, and includes production processing unit 20 as a functional block, production information storage unit 24, floor information storage unit 25, and worker information storage unit 26 which are storage devices. Production management device 1 further includes production input unit 27, production display unit 28, device-side communication unit 29, and wired communication unit 30. Production processing unit 20 is a data processing device and is configured with general-purpose hardware such as a central processing unit (CPU) and software for controlling the hardware. Alternatively, production processing unit 20 may be configured with a dedicated circuit. Production processing unit 20 includes work prediction processing unit 21, standby position determination unit 22, and communication processing unit 23 as internal processing units.

Production input unit 27 includes an input device such as a keyboard, a touch panel, and a mouse, and is used when inputting operation commands and data. Production display unit 28 includes a display device such as a liquid crystal panel, and displays various data stored in each storage unit. In addition, production display unit 28 displays various information such as an operation screen for the operation by production input unit 27. Device-side communication unit 29 is a communication interface, and wirelessly transmits and receives data to and from terminal-side communication unit 4 of mobile terminal 3. Wired communication unit 30 is a communication interface, and transmits and receives data to and from management computer 7 and the production facility configuring component mounting lines L1 to L3 via communication network 6. Instead of wired communication unit 30, a wireless communication unit that wirelessly communicates via communication network 6 may be provided. Production management device 1 does not need to be configured by one computer, and may be configured by a plurality of devices. For example, all or a part of the storage device may be provided in the cloud via a server.

Figure 4:
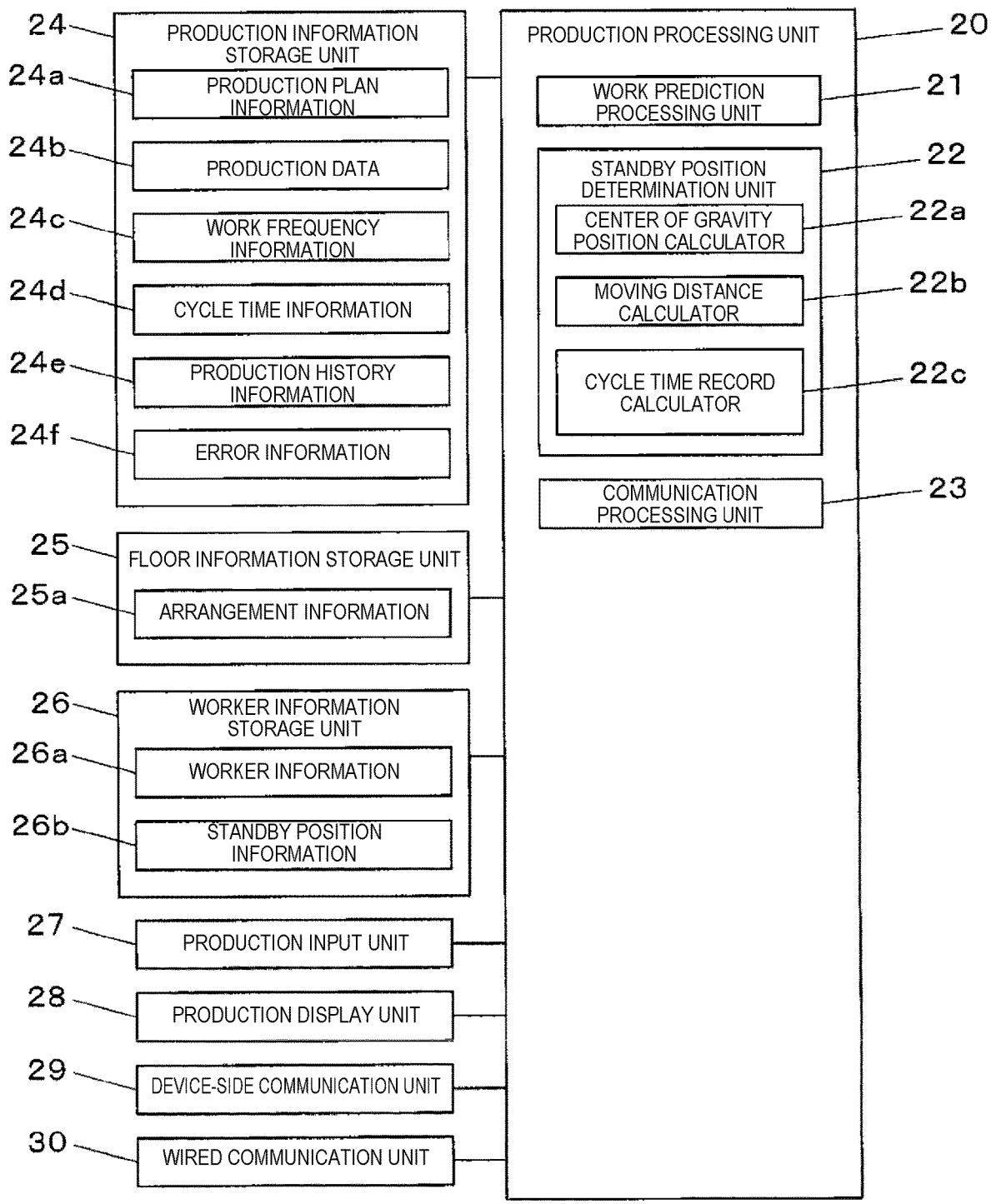
FIG. 4 is a functional block diagram illustrating a configuration of the production management device according to the exemplary embodiment of the present disclosure.

As illustrated in FIG. 4, production information storage unit 24 stores production plan information 24a, production data 24b, work frequency information 24c, cycle time information 24d, production history information 24e, error information 24f, and the like. Production plan information 24a includes a production plan including the number of mounting boards to be produced, a scheduled start time of production, a scheduled end time of production, and the like for each production model name that specifies a model of the mounting board produced in component mounting lines L1 to L3. Production data 24b includes the component name of the component mounted on the board, a mounting position (XY coordinates), and a mounting speed for each production model name. In addition, production data 24b includes a positions where tape feeder 13 for supplying the component is installed in carriage 14, and positions of component mounters M3 to M6 where carriage 14 is installed (front side, rear side) and component supply unit 12.

Production history information 24e includes a work history including a record of a work time for each board of each production facility of component mounting lines L1 to L3. Error information 24f includes history information on various errors including the automatically recoverable error and the automatically unrecoverable error that occurred in each production facility of component mounting lines L1 to L3. The production history and error history information may be collectively copied from the data transmitted to management computer 7 in a timely manner and collected, or the data may be collected from each production facility in a timely manner.

Arrangement information 25a and the like are stored in floor information storage unit 25.

Figure 5:
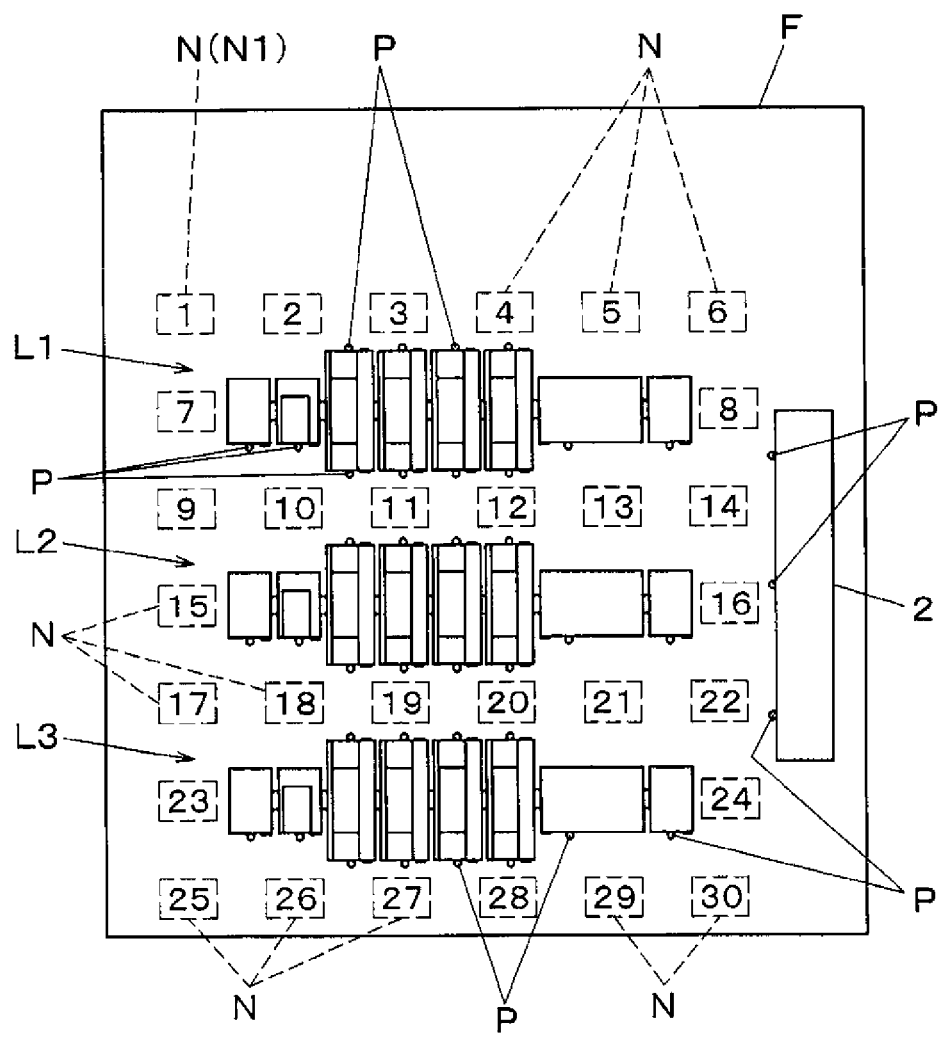
FIG. 5 is an explanatory diagram illustrating an example of arrangement information used in the production management device according to the exemplary embodiment of the present disclosure.

Next, an example of arrangement information 25a will be described with reference to FIG. 5. Arrangement information 25a includes a size of floor F, a disposition position in floor F of component shelf 2 and the production facilities configuring component mounting lines L1 to L3 arranged on floor F (coordinates in floor F and connection order of the production facilities configuring component mounting lines L1 to L3, or the like), and sizes of them. In addition, arrangement information 25a includes working position P (coordinates in floor F) of component shelf 2 and each production facility. Furthermore, arrangement information 25a includes positions of a plurality of moving nodes N (coordinates in floor F) set at predetermined intervals on the path on which worker W moves in floor F. In FIG. 5, working positions P are displayed by a white circle. In addition, around component mounting lines L1 to L3 and between component mounting lines L1 to L3 and component shelf 2, thirty moving nodes N1 to N30 are set.

In FIG. 4, worker information storage unit 26 stores worker information 26a, standby position information 26b, and the like. Worker information 26a includes a worker number that specifies worker W for each worker W, a skill level of the work, a type of work that can be worked, a standard time of work, and a moving speed. In addition, worker information 26a includes the information on the production facility that the worker is in charge and the areas in charge A1 and A2 (see FIG. 7). Worker W stored in worker information 26a includes an automatic conveyance vehicle (conveyance robot) that conveys the members on floor F and replenishes the production facility with the members. The automatic conveyance vehicle includes automatic conveyance vehicles that have a robot arm and replenish the production facility with the members to by themselves, in addition to the automatic conveyance vehicle that only conveys the members.

In FIG. 4, work prediction processing unit 21 calculates a work frequency (number of work times per unit time, work time) that worker W works at each production facility for each working position P based on production plan information 24a, production data 24b, and the facility layout included in arrangement information 25a. As the work of worker W at the production facility, a component replenishing work for replenishing the members used in the production facility during production, a setup change work for replacing the members used in the production facility due to production switching, an error recovering work for the errors that occur in the production facility and the like are included. The frequencies of occurrence of the component replenishing work, the setup change work, and the error recovering work are a first work frequency, a second work frequency, and a third work frequency, respectively. The calculated work frequency is stored in production information storage unit 24 as work frequency information 24c.

In addition, work prediction processing unit 21 calculates a predicted value of the average work time that each production facility works for one board, based on production plan information 24a, production data 24b, and facility layout included in arrangement information 25a. The average work time is called a cycle time. In addition, work prediction processing unit 21 predicts the bottleneck production facility in which the calculated predicted value of the cycle time is longest. The predicted cycle time and the information on the bottleneck production facility (bottleneck information) is stored in production information storage unit 24 as cycle time information 24d.

Work prediction processing unit 21 may calculate the predicted value of the work frequency and the cycle time, based on the production record of the production facility included in production history information 24e (probability of occurrence of work, and the like) and the record of error occurred in production facility included in error information 24f (probability of occurrence of error, and the like), and may predict the production facility which is the bottleneck. In addition, work frequency information 24c and cycle time information 24d may be created by another computer of production management device 1 and may be stored in production information storage unit 24. As described above, work prediction processing unit 21 is a production frequency calculator that calculates the work frequency of each production facility based on the probability of occurrence of work occurring in each of the plurality of production facilities.

Standby position determination unit 22 is an information processing unit such as a CPU, and includes center of gravity position calculator 22a, moving distance calculator 22b, and cycle time record calculator 22c as an internal processing unit. Standby position determination unit 22 determines the standby position where worker W waits for the work in floor F. The determined standby position is stored in worker information storage unit 26 as standby position information 26b. There are various methods for determining the standby position by standby position determination unit 22, and some of the examples will be described below.

First, the calculation of the position of center of gravity (hereinafter referred to as "center of gravity position G") of working position P by center of gravity position calculator 22a, and the determination of standby position S1 based on center of gravity position G by standby position determination unit 22 will be described in detail with reference to FIG. 6A. In this example, it is assumed that worker W is in charge of only the production facility of component mounting line L1 in floor F included in arrangement information 25a illustrated in FIG. 5, and it is assumed that there is no work in working position P of component shelf 2. That is, area in charge A of worker W is the production facility included in component mounting line L1, and moving nodes N set in the movement path of worker W are moving nodes N1 to N14.

Figure 6A:
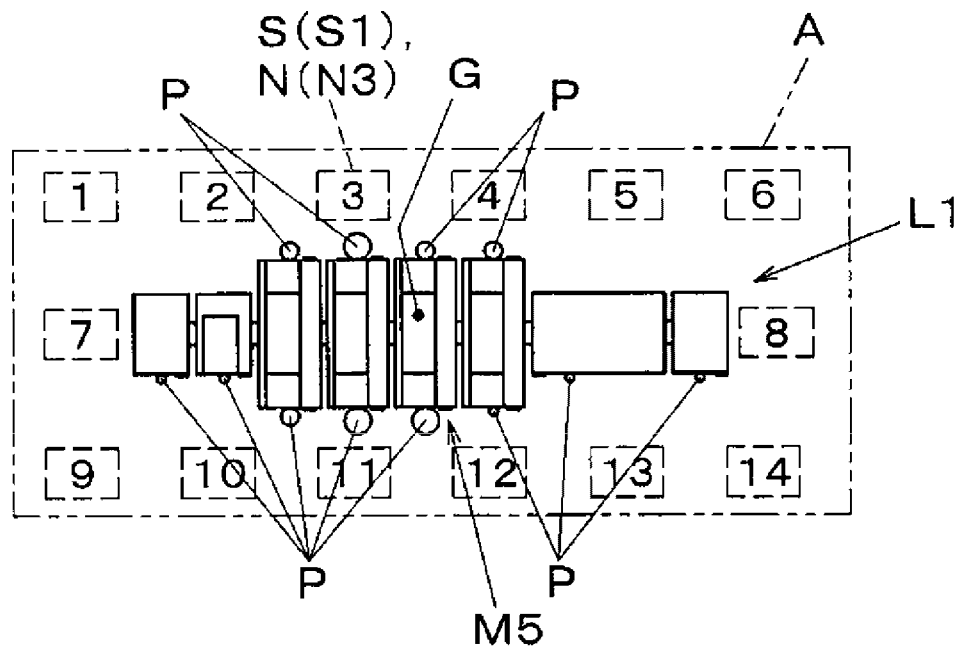
FIG. 6A is an explanatory diagram illustrating an example of a standby position based on the center of gravity position determined in the production management device according to the exemplary embodiment of the present disclosure.

In FIG. 6A, working position P where worker W works at each production facility of component mounting line L1 is displayed by a white circle. The size of the white circle represents the size of the work frequency included in work frequency information 24c. That is, working position P displayed by a large white circle indicates that the work frequency is high. Center of gravity position calculator 22a weights working position P of each production facility based on the production frequency, and calculates center of gravity position G of working position P. In weighting based on the work frequency, the work frequency may be used as it is, or the work frequency may be divided into a plurality of categories and different weights may be given to each category.

In the example in FIG. 6A, center of gravity position G is calculated to be closer to the rear side (upper side in the drawing) in component mounter M5. Standby position determination unit 22 determines standby position S1 based on the calculated center of gravity position G. If center of gravity position G is in the production facility where worker W cannot wait, moving node N3 closest to center of gravity position G is determined to be standby position S1. The method of determining standby position S1 using center of gravity position G is not limited to the method described above. For example, worker W may select standby position S1 by presenting a plurality of standby positions S1 from moving node N in the vicinity of center of gravity position G. Alternatively, among a plurality of moving nodes N close to center of gravity position G, moving node N closest to the production facility having a high work frequency may be determined as standby position S1.

As described above, standby position determination unit 22 including center of gravity position calculator 22a weights a position where worker W works (working position P) in each of the plurality of production facilities based on the work frequency included in work frequency information 24c, and calculates position of center of gravity (center of gravity position G). Standby position determination unit 22 determines standby position S1 based on center of gravity position G. If center of gravity position G is in a position where worker W cannot wait, standby position determination unit 22 determines the position near center of gravity position G (moving node N3) where worker W can wait to be standby position S1. In this way, standby position S1 having a good production efficiency can be determined in floor F.

Next, the calculation of the moving distance of worker W by moving distance calculator 22b and the determination of standby position S2 based on the moving distance by standby position determination unit 22 will be described in detail with reference to FIG. 6B. It is assumed that the area in charge A of worker W and the work frequency of production facility are the same as those in the example in FIG. 6A. Moving distance calculator 22b calculates the moving distance of a movement path from moving nodes N1 to N14 to working position P of each production facility for each moving node N1 to N14. Moving distance calculator 22b determines the movement path so as to bypass the area where the production facility that hinders the movement are arranged.

Figure 6B:
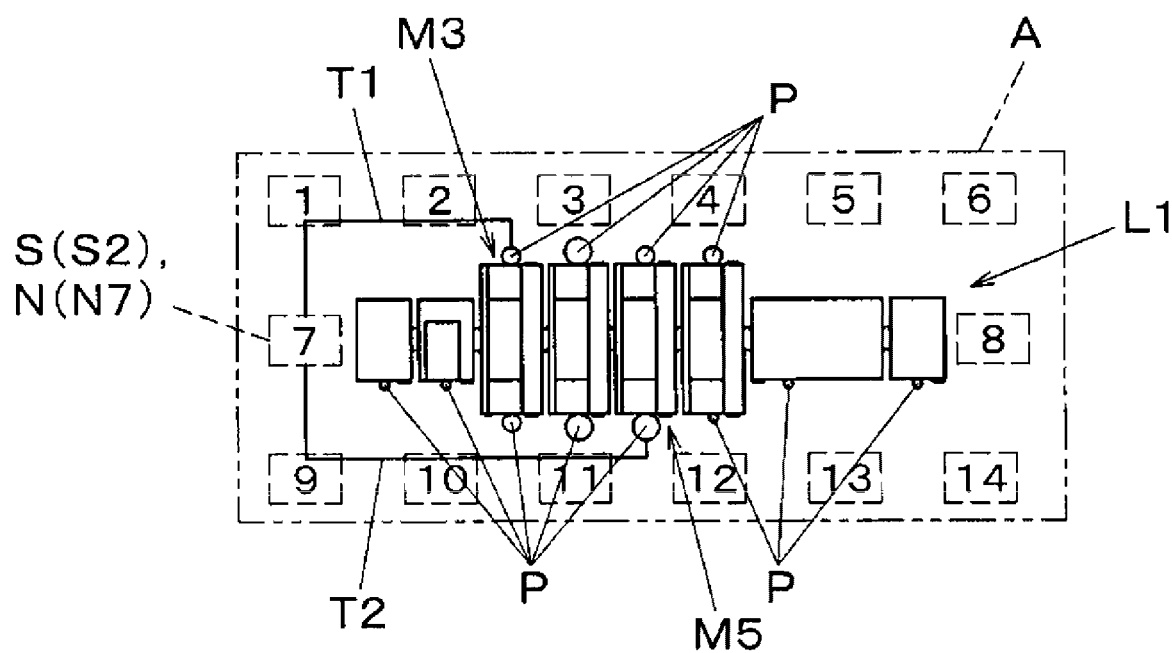
FIG. 6B is an explanatory diagram illustrating an example of a standby position based on a moving distance determined in the production management device according to the exemplary embodiment of the present disclosure.

In FIG. 6B, as an example of the movement path, movement path T1 from moving node N7 to working position P on the rear side of component mounter M3, and movement path T2 from moving node N7 to working position P on the front side of component mounter M5, are displayed. Standby position determination unit 22 calculates a weighted moving distance that is obtained by multiplying the calculated moving distance to working position P by the weight based on the work frequency of working position P included in work frequency information 24c. Next, standby position determination unit 22 calculates the total weighted moving distance which is the sum of the weighted moving distances for each moving node N1 to N14, and determines moving node N7 having the smallest total weighted moving distance as standby position S2.

The method of determining standby position S2 using the weighted moving distance is not limited to the method described above. For example, if there are a plurality of moving nodes N having the smallest total weighted moving distance, worker W may select one of standby position S2 by presenting a plurality of standby position S2.

As described above, standby position determination unit 22 including moving distance calculator 22b calculates the moving distance from moving nodes N1 to N14 to each working position P for each moving node N1 to N14 based on a plurality of moving nodes N1 to N14 and arrangement information 25a. A plurality of moving nodes N1 to N14 are set on the path on which worker W is moving on floor F. Arrangement information 25a includes the coordinates of working position P, which is the position where worker W works in the production facility. Standby position determination unit 22 determines standby position S2 based on the plurality of calculated moving distances and the work frequency included in work frequency information 24c. As a result, it is possible to determine standby position S2 where the moving time is short and the production efficiency is good on floor F.

When a frequency of automatic recovery of the production facility from the error exceeds a predetermined value, there is a possibility that an error that cannot be automatically recovered will occur at the production facility, or the frequency of automatic recovery may reduce the production tact in the near future. Therefore, standby position determination unit 22 determines standby position S based on working position P of the production facility and working position P having a high work frequency calculated by work prediction processing unit 21 described above. For example, the work frequency of the production facility is weighted by a predetermined weight, and then standby position S is determined. As described above, when the automatic recovery information that the work required for the production facility included in error information 24f is worked by the production facility itself is acquired, standby position determination unit 22 determines standby position S based on the acquired automatic recovery information and work frequency information 24c calculated by work prediction processing unit 21.

As a result, it is possible to shorten the time for the error recovering work after an error occurs, in which the production facility is stopped. In addition, it becomes easier to deal with the cause of the decrease in production tact in parallel with other work measures. As working position P having a high work frequency, one working position P having the highest work frequency may be selected, or a plurality of working positions P may be selected in order from one working position P having the highest work frequency. In addition, as long as being based on work frequency information 24c, the calculation method using center of gravity position G described above may be used or the calculation method using moving node N may be used.

Cycle time record calculator 22c calculates a record value of the cycle time of the production facility based on the production record (work time, and the like) of the production facility included in production history information 24e and specifies the production facility that is currently the bottleneck. The calculated record value of the cycle time and the information on the production facility which is the current bottleneck are stored in production information storage unit 24 as cycle time information 24d.

If the production facility that is currently bottleneck and is stored in cycle time information 24d is changed to a production facility that is different from the prediction, there is a high possibility that a trouble occurs in the production facility. Therefore, standby position determination unit 22 determines standby position S based on working position P of the production facility and working position P having a high work frequency calculated by work prediction processing unit 21 described above. For example, the work frequency of the production facility is weighted by a predetermined weight, and then standby position S is determined.

As described above, when the information (cycle time information 24d) on production facility which is bottleneck is acquired, standby position determination unit 22 determines standby position S based on the acquired information on the bottleneck. Standby position determination unit 22 may determine standby position S based on not only the timing when the production facility which is the bottleneck is changed from the prediction but also the production facility predicted as the bottleneck before the start of production and work frequency information 24c calculated by work prediction processing unit 21.

As a result, the moving time when the work occurs at the production facility which is a bottleneck can be shortened, and thus, it is possible to shorten the stop time of the production facility due to the work. In addition, it becomes easier to deal with the cause of the decrease in production tact in parallel with other work measures. As working position P having a high work frequency, one working position P having the highest work frequency may be selected, or a plurality of working positions P may be selected in order from one working position P having the highest work frequency. In addition, as long as being based on work frequency information 24c, the calculation method using center of gravity position G described above may be used or the calculation method using moving node N may be used.

Standby position determination unit 22 calculates a difference between the predicted value and the record value of the cycle time included in cycle time information 24d for each production facility. If the calculated difference exceeds a predetermined value, there is a high possibility that a trouble has occurred in the production facility. Therefore, standby position determination unit 22 determines standby position S based on working position P of the production facility and working position P having a high work frequency calculated by work prediction processing unit 21 described above. For example, standby position determination unit 22 determines standby position S by giving predetermined weights to the work frequency of the production facility with respect to working position P having a high work frequency. In this way, when the predicted value of the cycle time in the production by the production facility and the information (cycle time information 24d) on the record value are acquired, standby position determination unit 22 determines standby position S based on the acquired cycle time information and work frequency information 24c calculated by work prediction processing unit 21.

As a result, it is possible to shorten the time for the error recovering work after an error occurs, in which the production facility is stopped. In addition, it becomes easier to deal with the cause of the decrease in production tact in parallel with other work measures. As working position P having a high work frequency, one working position P having the highest work frequency may be selected, or a plurality of working positions P may be selected in order from one working position P having the highest work frequency. In addition, as long as being based on work frequency information 24c, the calculation method using center of gravity position G described above may be used or the calculation method using moving node N may be used.

Figure 7:
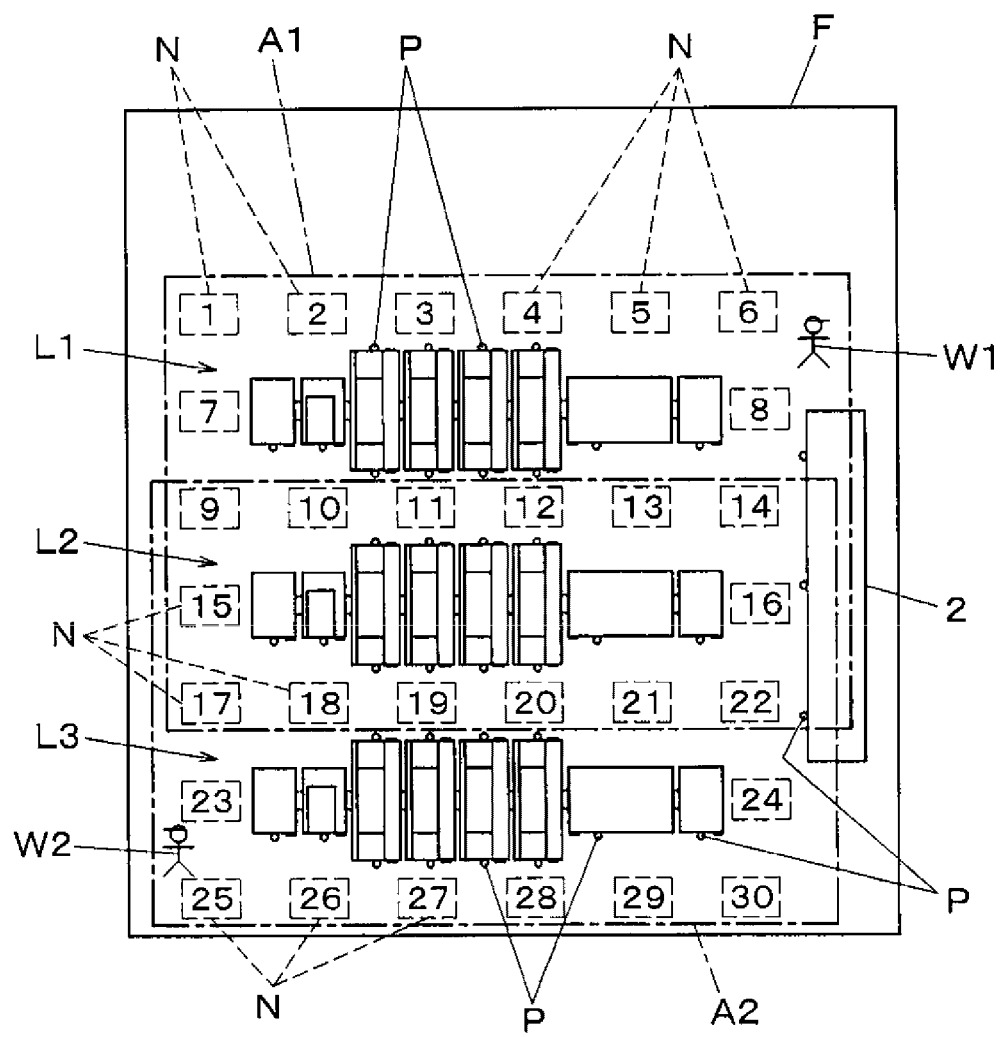
FIG. 7 is an explanatory diagram illustrating an example of an area in charge of the worker working in the plurality of production facilities illustrated in FIG. 1.

FIG. 7 illustrates an example of areas in charge A1 and A2 set in each of workers W1 and W2. Area in charge A1 of worker W1 is the production facilities in component mounting lines L1 and L2 and component shelf 2, and includes moving nodes N1 to N22. Area in charge A2 of worker W2 is the production facilities in component mounting lines L2 and L3 and component shelf 2, and includes moving nodes N9 to N30. Standby position determination unit 22 determines standby position S for each of areas in charge A1 and A2 set for each of workers W1 and W2. At that time, for component mounting line L2 where areas in charge A1 and A2 overlap, standby position determination unit 22 distributes the works occurred in component mounting line L2 to workers W1 and W2 based on the ability information on the workers W1 and W2 included in worker information 26a.

That is, for the production facilities in which workers W1 and W2 in charge overlap, standby position determination unit 22 determines standby position S by dividing the work frequency of the production facilities for worker W1 and worker W2. For example, standby position S of worker W1 is determined to be any of moving nodes N1 to N22 based on the work frequency of the production facility in component mounting line L1 in area in charge A1 and the work frequency of the production facility in component mounting line L2 divided to worker W2, as standby position S. In this way, it is possible to determine standby position S with good production efficiency in floor F for each of workers W1 and W2.

In FIG. 4, communication processing unit 23 transmits standby position S included in standby position information 26b to mobile terminal 3 owned by worker W via device-side communication unit 29 in response to a request from mobile terminal 3. In addition, when standby position information 26b stored in worker information storage unit 26 is updated, communication processing unit 23 transmits updated standby position S to mobile terminal 3 of involved worker W. Transmitted standby position S is displayed on touch panel 5 of mobile terminal 3. As a result, worker W can know the latest standby position S having good production efficiency. The mobile terminal 3 may be a device owned by worker W, and includes a wearable terminal. In addition, when worker W is an automatic conveyance vehicle, mobile terminal 3 refers to a device installed in automatic conveyance vehicle, and the automatic conveyance vehicle is controlled to move to transmitted standby position S.

Figure 8:
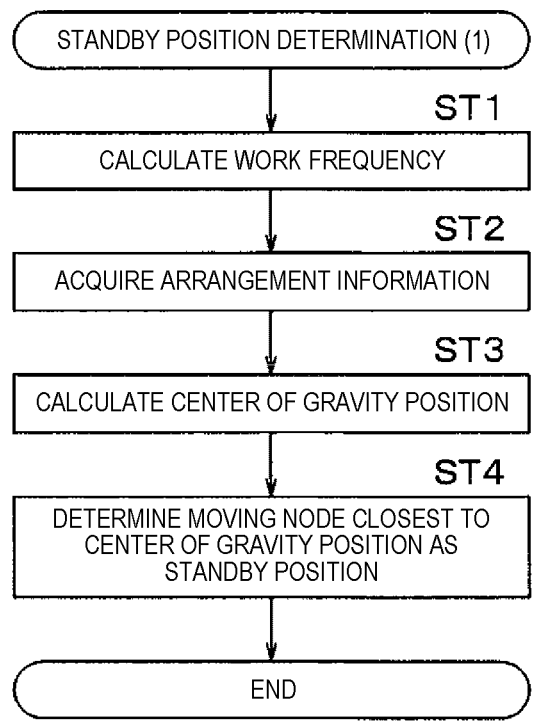
FIG. 8 is a flowchart illustrating a first standby position determination method according to the exemplary embodiment of the present disclosure.

Next, along a flow illustrated in FIG. 8, a first standby position determination method in which standby position S1 is determined based on center of gravity position G by production management device 1 as the standby position determination device will be described with reference to FIG. 6A. In FIG. 8, first, work prediction processing unit 21 (work frequency calculator) calculates each work frequency based on the probability of occurrence of work occurring in each production facility (ST1: work frequency calculation step). The calculated work frequency is stored in production information storage unit 24 as work frequency information 24c. Next, standby position determination unit 22 acquires arrangement information 25a including the facility layout of the production facilities (ST2: arrangement information acquisition step).

Next, center of gravity position calculator 22a weights a position (working position P) where worker W works in each of the plurality of production facilities based on work frequency information 24c, and calculates a position of center of gravity (center of gravity position G) (ST3: center of gravity position calculation step). Next, standby position determination unit 22 determines moving node N3 closest to center of gravity position G as standby position S1 based on calculated center of gravity position G (ST4: first standby position determination step). As described above, in the first standby position determination method, standby position S1 where worker W waits for the work in floor F is determined based on work frequency information 24c and arrangement information 25a in floor F. Work frequency information 24c includes the work frequency of which worker W works at each production facility. Arrangement information 25a includes the facility layout of a plurality of production facilities. In this way, standby position S1 having a good production efficiency can be determined in floor F.

Figure 9:
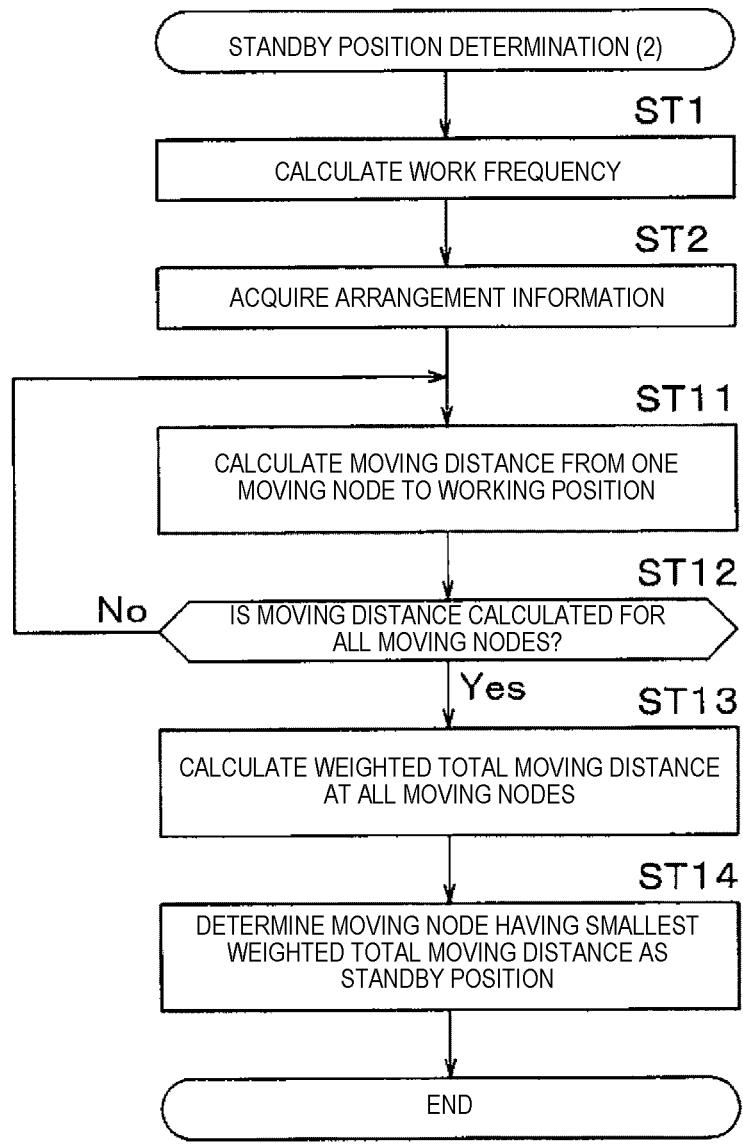
FIG. 9 is a flowchart illustrating a second standby position determination method according to the exemplary embodiment of the present disclosure.

Next, along a flow illustrated in FIG. 9, a second standby position determination method in which standby position S2 is determined based on the moving distance by production management device 1 will be described with reference to FIG. 6B. Hereinafter, the same steps as those in the first standby position determination method are designated by the same reference numerals, and detailed descriptions thereof will be omitted.

First, the work frequency calculation step (ST1) and the arrangement information acquisition step (ST2) are executed. Next, moving distance calculator 22b calculates the moving distance from one of a plurality of moving nodes N1 to N14 to all working positions P of all production facilities (ST11: moving distance calculation step). Next, moving distance calculator 22b determines whether or not the moving distance is calculated for all moving nodes N1 to N14 (ST12). If there are uncalculated moving nodes N1 to N14 (No in ST12), the moving distance is calculated by returning to the moving distance calculation step (ST11). That is, moving distance calculator 22b calculates the moving distances to working position P for all moving nodes N1 to N14 (ST11 and ST12).

When the moving distances are calculated for all moving nodes N1 to N14 (Yes in ST12), standby position determination unit 22 calculates a weighted moving distance by multiplying the moving distance by a weight based on the work frequency for each working position P. Standby position determination unit 22 calculates the total weighted moving distance obtained by adding the moving distances for each moving node N1 to N14 for all moving nodes N1 to N14 (ST13: weighted total moving distance calculation step). Next, standby position determination unit 22 determines moving node N7 having the smallest weighted total moving distance as standby position S2 (ST14: second working position determination step).

As described above, in the second standby position determination method, the moving distances from moving nodes N1 to N14 to a position (working position P) where worker W works in the production facility are calculated for each moving node N1 to N14 (ST11 and ST12). These moving distances are calculated based on a plurality of moving nodes N1 to N14 set on the path on which worker W moves in floor F and arrangement information 25a. Standby position S2 is determined based on a plurality of moving distances and work frequency information 24c (ST13 and ST14). In this way, standby position S2 having a good production efficiency can be determined in floor F.

Figure 10:
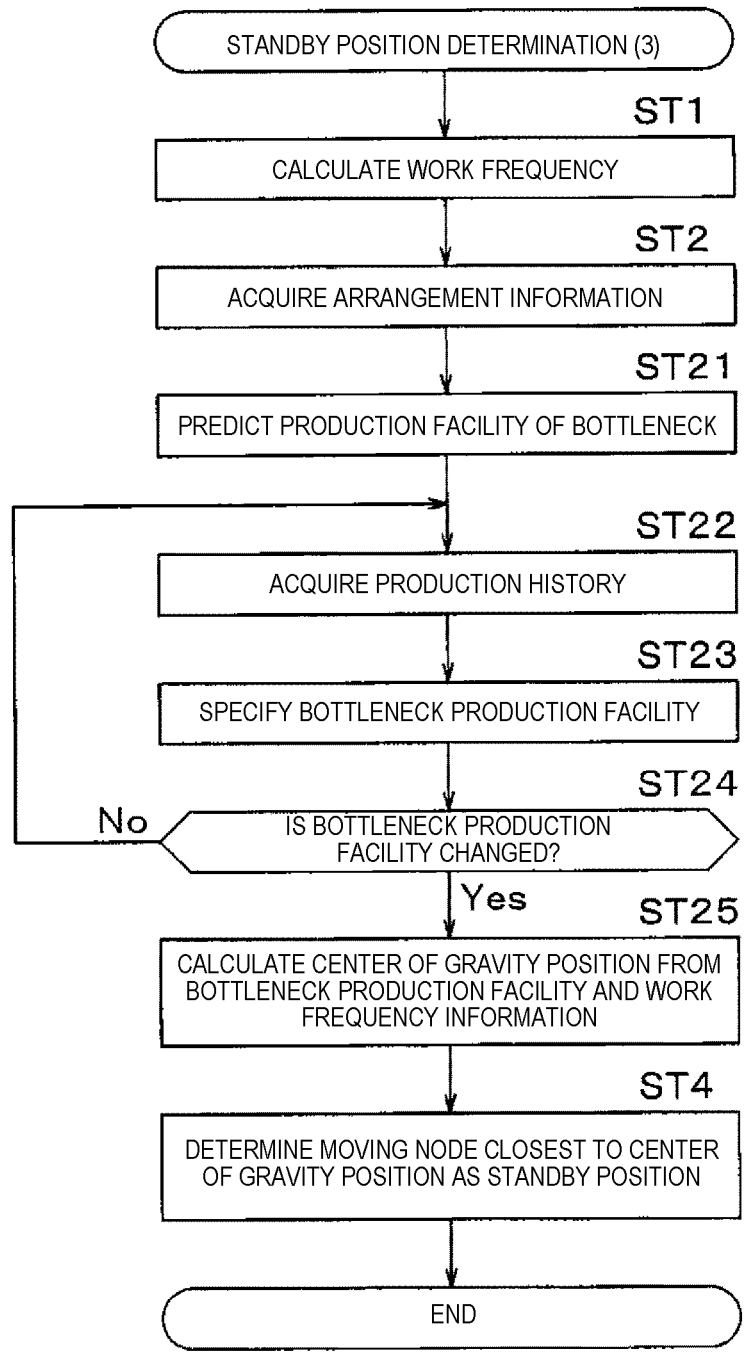
FIG. 10 is a flowchart illustrating a third standby position determination method according to the exemplary embodiment of the present disclosure.

Next, along a flow illustrated in FIG. 10, a third standby position determination method in which standby position S is determined based on the production facility which is the bottleneck and work frequency information 24c by production management device 1 will be described. First, the work frequency calculation step (ST1) and the arrangement information acquisition step (ST2) are executed. Next, work prediction processing unit 21 predicts the bottleneck production facility based on production plan information 24a, production data 24b, and the facility layout included in arrangement information 25a (ST21: bottleneck prediction step). Next, cycle time record calculator 22c acquires production history information 24e accumulated during the production work (ST22: production history acquisition step).

Next, cycle time record calculator 22c specifies the currently bottleneck production facility based on the production record (work time, and the like) of the production facility included in production history information 24e (ST23: bottleneck specification step). Next, standby position determination unit 22 determines whether or not the currently bottleneck production facility is changed from the production facility which is predicted to be the bottleneck or the bottleneck production facility (ST24). If the bottleneck production facility is not changed (No in ST24), the production history acquisition step (ST22) and the bottleneck specification step (ST23) are repeated.

If the bottleneck production facility is changed (Yes in ST24), center of gravity position calculator 22a weights working position P of each production facility based on working positions P and work frequency information 24c of a plurality of production facilities. Center of gravity position calculator 22a further gives predetermined weights to working position P of the bottleneck production facility, and calculates the position of center of gravity (center of gravity position G) (ST25: second center of gravity position calculation step). Next, the first standby position determination step (ST4) is executed, and moving node N closest to calculated center of gravity position G is determined as the third standby position.

As described above, in the third standby position determination method, when the information on the bottleneck production facility is acquired (ST22 and ST23), standby position S is determined based on the acquired bottleneck information and work frequency information 24c (ST25 and ST4). As a result, the moving time when the work occurs at the production facility which is a bottleneck can be shortened, and thus, it is possible to shorten the stop time of the production facility due to the work. In addition, it becomes easier to deal with the cause of the decrease in production tact in parallel with other work measures.

Figure 11:
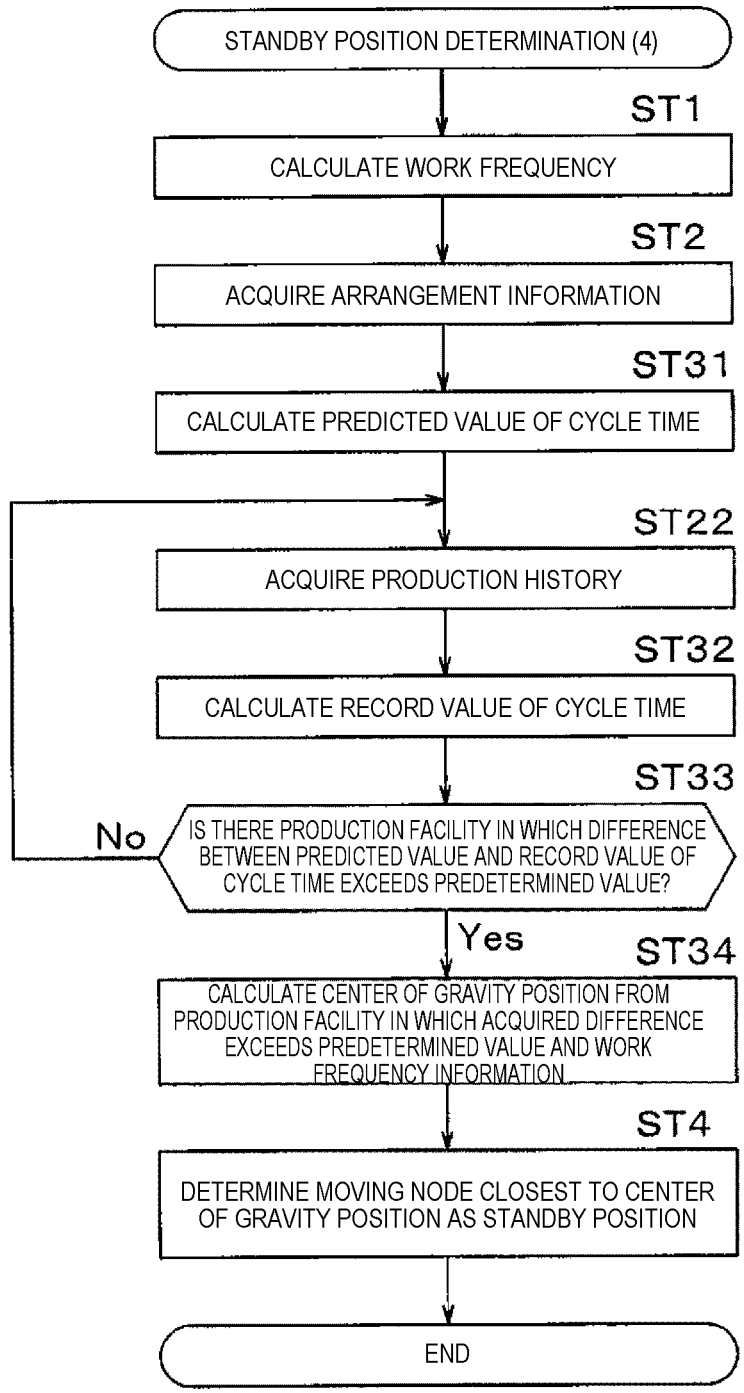
FIG. 11 is a flowchart illustrating a fourth standby position determination method according to the exemplary embodiment of the present disclosure.

Next, along a flow illustrated in FIG. 11, a fourth standby position determination method in which standby position S is determined based on the cycle time and work frequency information 24c by production management device 1 will be described. Hereinafter, the same steps as those in the third standby position determination method are designated by the same reference numerals, and detailed descriptions thereof will be omitted. First, the work frequency calculation step (ST1) and the arrangement information acquisition step (ST2) are executed. Next, work prediction processing unit 21 predicts the cycle time for each production facility based on production plan information 24a, production data 24b, and the facility layout included in arrangement information 25a (ST31: cycle time prediction step). Next, the production history acquisition step (ST22) is executed.

Next, cycle time record calculator 22c calculates the record value of the cycle time for each production facility based on the production record (work time, and the like) of the production facility included in production history information 24e (ST32: cycle time record calculation step). Next, standby position determination unit 22 determines whether or not there is a production facility in which the difference between the predicted value and the record value of the cycle time exceeds a predetermined value (ST33). If there is no production facility in which the difference exceeds the predetermined value (No in ST33), the production history acquisition step (ST22) and the cycle time record calculation step (ST32) are repeated.

If there is the production facility in which the difference exceeds the predetermined value (Yes in ST33), center of gravity position calculator 22a weights working position P of each production facility based on working position P and work frequency information 24c of a plurality of production facilities. Furthermore, center of gravity position calculator 22a calculates the position of center of gravity (center of gravity position G) by giving predetermined weights to working position P of the production facility in which the acquired difference exceeds the predetermined value (ST34: third center of gravity position calculation step). Next, the first standby position calculation step (ST4) is executed, and moving node N closest to the calculated center of gravity position G is determined as a fourth standby position.

As described above, In the fourth standby position determination method, when the information on the predicted value and the record value of the cycle time for the production by the production facilities are acquired (ST22 and ST32), standby position S is determined based on the acquired cycle time information and work frequency information 24c (ST34 and ST4). As a result, it is possible to shorten the time for the error recovering work after an error occurs, in which the production facility is stopped. In addition, it becomes easier to deal with the cause of the decrease in production tact in parallel with other work measures.

Next, along a flow illustrated in FIG. 12, a fifth standby position determination method in which standby position S is determined based on error information 24f and work frequency information 24c by production management device 1 will be described. First, the work frequency calculation step (ST1) and the arrangement information acquisition step (ST2) are executed. Next, standby position determination unit 22 acquires error information 24f accumulated during the production work (ST41: error information acquisition step). Next, standby position determination unit 22 determines whether there is a production facility whose frequency of automatic recovery from the error exceeds a predetermined value or not based on the automatic recovery information included in error information 24f (ST42). If there is no production facility whose frequency exceeds the predetermined value (No in ST42), the error information acquisition step (ST41) and the determination step (ST42) are repeated.

If there is the production facility whose frequency exceeds the predetermined value (Yes in ST42), center of gravity position calculator 22a weights working position P of each production facility based on working position P and work frequency information 24c of a plurality of production facilities. Furthermore, center of gravity position calculator 22a calculates the position of center of gravity (center of gravity position G) by giving predetermined weights to working position P of the production facility whose acquired frequency of automatic recovery exceeds a predetermined value (ST43: fourth center of gravity position calculation step). Next, the first standby position calculation step (ST4) described above is executed, and moving node N closest to the calculated center of gravity position G is determined as a fifth standby position.

As describe above, in the fifth standby position determination method, when the automatic recovery information that the production facility itself has performed the work required for the production facility is acquired (ST41), standby position S is determined based on the acquired automatic recovery information and work frequency information 24c (ST43 and ST4). As a result, it is possible to shorten the time for the error recovering work after an error occurs, in which the production facility is stopped. In addition, it becomes easier to deal with the cause of the decrease in production tact in parallel with other work measures.

As described above, production management device 1 (standby position determination device) holds work frequency information 24c and includes standby position determination unit 22. Work frequency information 24c includes the work frequency in which worker W works in the production facility. Standby position determination unit 22 determines standby position S where worker W waits for the work in floor F based on arrangement information 25a of floor F including facility layout of a plurality of production facilities. As a result, it is possible to determine standby position S with good production efficiency in floor F in which the production facilities are arranged.

The present disclosure has been described above based on the exemplary embodiment. In the present exemplary embodiment, various modification examples can be made for the types and combinations of the products produced by the production facilities in floor F, and it is understood by those skilled in the art that such modification examples are also within the scope of the present disclosure. For example, the production facility may be a production facility of an assembly production line for assembling an electronic device that is a product, or a production facility of a food processing line for manufacturing a processed food product that is a product.

The timing of determining the standby position is not particularly limited. For example, standby position S may be determined in a medium-to-long term unit such as a weekly unit and a monthly unit. If the standby position is determined in the medium-to-long term unit, for example, when worker W is an automatic conveyance vehicle, it is preferable to install a charging unit at standby position S. This makes it possible to efficiently move and charge the automatic conveyance vehicle. In addition, standby position S may be determined in a short-term unit such as an hour unit, and a day unit. If standby position S is determined in a short-term unit, for example, in a case of replenishing work due to the member shortage, since once the member is replenished, the replenishing work does not occur for a certain period of time, the work frequency during that time is reduced. Therefore, by updating the work frequency on the hour unit or the day unit, a position closer to the production facilities having a higher work frequency can be set as standby position S.

In addition, among moving nodes N, moving node N that can be set as standby position S and moving node N that cannot be set as standby position S may be provided. For example, a position overlooking signal tower 16 of the plurality of production facilities is moving node N that can be set as standby position S. In FIG. 5 and FIG. 7, moving nodes N1 to N6, moving nodes N9 to 14, moving nodes N17 to 22, and moving nodes N25 to 30 are such moving nodes. In addition, if a production status reporting system (so-called Andon) capable of checking the operating status of component mounting line L1 to L3 is provided in floor F, a position overlooking the Andon is moving node N that can be set as standby position S. For example, in FIG. 5 and FIG. 7, if each Andon is installed near the leading facility of component mounting lines L1 to L3, moving nodes N1, 7, 9, 15, 17, 23, and 25 are such moving nodes.

In addition, any of the third standby position determination method to the fifth standby position determination method described above determine the standby position based on work frequency information 24c. In addition to this, in the third standby position determination method, the moving node closest to working position P which is the he bottleneck may be determined as standby position S without being based on work frequency information 24c. Similarly, in the fourth standby position determination method, moving node N closest to working position P of the production facility in which the difference between the predicted value and the record value of the cycle time exceeds a predetermined value may be determined as standby position S. In the fifth standby position determination method, moving node N closest to working position P of the production facility whose frequency of automatic recovery from an error exceeds a predetermined value may be determined as standby position S.

INDUSTRIAL APPLICABILITY

A standby position determination device and a standby position determination method in the present disclosure have the effects of being able to determine a standby position with good production efficiency in a floor where the production facilities are arranged, and are useful in the field of mounting components on a board.

REFERENCE MARKS IN THE DRAWINGS 1 production management device
2 component shelf
3 mobile terminal
4 terminal-side communication unit
5 touch panel
6 communication network
7 management computer
11 mounting head
11a nozzle
12 component supply unit
13 tape feeder
14 carriage
15 reel
16 signal tower
17 touch panel
18 operation button
20 production processing unit
21 work prediction processing unit
22 standby position determination unit
22a center of gravity position calculator
22b moving distance calculator
22c cycle time record calculator
23 communication processing unit
24 production information storage unit
24a production plan information
24b production data
24c work frequency information
24d cycle time information
24e production history information
24f error information
25 floor information storage unit
25a arrangement information
26 worker information storage unit
26a worker information
26b standby position information
27 production input unit
28 production display unit
29 device-side communication unit
30 wired communication unit
A, A1, A2 area in charge
F floor
M1 board supply device
M2 printing device
M3, M4, M5, M6 component mounter
M7 reflow device
M8 board recovery device
P working position
S, S1, S2 standby position
W, W1, W2 worker

The invention claimed is:

1. A standby position determination device for determining a standby position for a worker to maintain a production device in case of an error,
wherein the standby position determination device is equipped with a wired communication unit configured to communicate with at least one component mounting line comprising a plurality of production devices connected in series, and a device-side communication unit configured to transmit the standby position to a mobile terminal of the worker,
wherein the standby position determination device is configured to retrieve work frequency information and floor arrangement information from a memory or a cloud server,
the standby position determination device comprising:
a standby position determination unit configured to determine the standby position where the worker waits for a work on a floor based on the work frequency information and the floor arrangement information, the work frequency information including a plurality of work frequencies that the worker works in each of a plurality of production facilities, the floor arrangement information including facility layouts of the plurality of production facilities.

2. The standby position determination device of claim 1, wherein the work frequency information includes a plurality of first work frequencies as the plurality of work frequencies, and
each of the plurality of first work frequencies is a frequency of occurrence of works of replenishing each of the plurality of production facilities with members used in each of the plurality of production facilities during production.

3. The standby position determination device of claim 1, wherein the work frequency information includes a plurality of second work frequencies as the plurality of work frequencies, and each of the plurality of second work frequencies is a frequency of occurrence of works of replacing members used in each of the plurality of production facilities due to production switching.

4. The standby position determination device of claim 1, wherein the work frequency information includes a plurality of third work frequencies as the plurality of work frequencies, and each of the plurality of third work frequencies is a frequency of occurrence of works for recovering errors that occur in each of the plurality of production facilities.

5. The standby position determination device of claim 1, wherein the standby position determination unit calculates a position of center of gravity by weighting positions where the worker works in each of the plurality of production facilities based on the work frequency information, and determines the standby position based on the position of center of gravity.

6. The standby position determination device of claim 5, wherein the standby position determination unit determines a position where the worker near the position of center of gravity can wait as the standby position, when the position of center of gravity is in a position where the worker cannot wait.

7. The standby position determination device of claim 1, wherein the standby position determination unit calculates a plurality of moving distances from each of a plurality of moving nodes set in a path on which the worker moves in the floor to a position where the worker works in each of the plurality of production facilities based on the plurality of moving nodes and the floor arrangement information, and determines the standby position based on the plurality of moving distances and the work frequency information.

8. The standby position determination device of claim 1, wherein the standby position determination unit acquires bottleneck information which is information on one production facility which is a bottleneck among the plurality of production facilities, and determines the standby position based on the acquired bottleneck information.

9. The standby position determination device of claim 1, wherein the standby position determination unit acquires automatic recovery information indication that the work required for each of the plurality of production facilities is worked by the production facility itself, and determines the standby position based on the acquired automatic recovery information.

10. The standby position determination device of claim 1, wherein the standby position determination unit acquires a predicted value and a record value of a cycle time required for production by each of the plurality of production facilities, and determines the standby position based on each of the acquired predicted value and record value of the cycle time.

11. The standby position determination device of claim 1, further comprising:

a production frequency calculator that calculates the plurality of work frequencies based on a probability of occurrence of works occurring in each of the plurality of production facilities.

12. The standby position determination device of claim 1, wherein the worker is one of a plurality of workers, and the standby position determination unit determines the standby position of each of the plurality of workers for a corresponding area in charge set for the worker.

13. A standby position determination method for determining a standby position for a worker to maintain a production device in case of an error, the method comprising:

communicating with at least one component mounting line comprising a plurality of production devices connected in series via a wired communication unit;

acquiring, from a memory or a cloud server, work frequency information including a work frequency that the worker works at each of a plurality of production facilities and floor arrangement information including facility layouts of the plurality of production facilities;

determining a standby position where a worker waits for a work on a floor based on the work frequency information and the floor arrangement information; and transmitting the standby position to a mobile terminal of the worker via the device-side communication unit.

14. The standby position determination method of claim 13, further comprising:

calculating a position of center of gravity by weighting positions where the worker works in each of the plurality of production facilities based on the work frequency information, and determining the standby position based on the position of center of gravity.

15. The standby position determination method of claim 13, further comprising:

calculating a plurality of moving distances from each of a plurality of moving nodes set in a path on which the worker moves in the floor to a position where the worker works in each of the plurality of production facilities based on the plurality of moving nodes and the floor arrangement information, and determining the standby position based on the plurality of moving distances and the work frequency information.

16. The standby position determination method of claim 13, further comprising:

acquiring bottleneck information which is information on one production facility which is a bottleneck among the plurality of production facilities, and determining the standby position based on the acquired bottleneck information.

17. The standby position determination method of claim 13, further comprising:

acquiring automatic recovery information that the work required for each of the plurality of production facilities is worked by the production facility, and determining the standby position based on the acquired automatic recovery information.

18. The standby position determination method of claim 13, further comprising:

acquiring a predicted value and a record value of a cycle time required for production by each of the plurality of production facilities, and determining the standby position based on each of the acquired predicted value and record value of the cycle time.

19. The standby position determination method of claim 13, further comprising:

calculating the plurality of work frequencies based on a probability of occurrence of works occurring in each of the plurality of production facilities.

20. The standby position determination method of claim 13, further comprising:
determining each of the standby positions of the plurality of workers for each area in charge set for each of the plurality of workers,
wherein the worker is one of a plurality of workers.

* * * * *